(12) United States Patent
Nyang et al.

(10) Patent No.: US 8,339,291 B2
(45) Date of Patent: Dec. 25, 2012

(54) ALPHABET INPUT DEVICE AND ALPHABET RECOGNITION SYSTEM IN SMALL-SIZED KEYPAD

(75) Inventors: Daehun Nyang, Seoul (KR); Kyung Hee Lee, Seoul (KR)

(73) Assignee: Inha-Industry Partnership Institute, Incheon (KR)

( * ) Notice: Subject to any disclaimer, the term of this patent is extended or adjusted under 35 U.S.C. 154(b) by 1002 days.

(21) Appl. No.: 12/344,248

(22) Filed: Dec. 25, 2008

(65) Prior Publication Data

US 2010/0007530 A1    Jan. 14, 2010

(30) Foreign Application Priority Data

Jul. 14, 2008 (KR) .................. 10-2008-0067954

(51) Int. Cl.
*H03M 11/00* (2006.01)
(52) U.S. Cl. ............ 341/23; 341/20; 341/22; 341/28; 710/67; 710/73; 379/433.06; 379/433.07
(58) Field of Classification Search .......... 341/20–35; 379/433.07, 433.06; 710/67, 73
See application file for complete search history.

(56) References Cited

U.S. PATENT DOCUMENTS

| 7,355,589 | B2 * | 4/2008 | Eo et al. | 345/168 |
|---|---|---|---|---|
| 2003/0030573 | A1 * | 2/2003 | Ure | 341/22 |
| 2009/0033523 | A1 * | 2/2009 | Park | 341/28 |

FOREIGN PATENT DOCUMENTS

| KR | 2002-0055833 | | 7/2002 | |
| KR | 10-2006-0029430 | * | 4/2006 | .............. 379/433.07 |
| KR | 20-0419301 | | 6/2006 | |

OTHER PUBLICATIONS

Ha et. al., "SIMKSEYS: An Efficient Keypad Configuration for Mobile Communications," IEEE Communications Magazine, Nov. 2004, pp. 136-142.
MacKenzie et. al., "LetterWise: Prefix-based Disambiguation for Mobile Text Input," In UIST, 2001, pp. 111-120.
Pavlovych et. al., "Less-Tap: A Fast and Easy-to-learn Text Input Technique for Phones," In Graphics Interface, 2003, pp. 97-104.

* cited by examiner

*Primary Examiner* — George Bugg
*Assistant Examiner* — Franklin Balseca
(74) *Attorney, Agent, or Firm* — Lucas & Mercanti, LLP

(57) ABSTRACT

Disclosed herein are an alphabet input device and an alphabet recognition system in a small-sized keypad. The device includes: a first keypad part comprising a plurality of buttons each of which is assigned with a symbol extracted from strokes of alphabet characters so that the alphabet characters be input by one of the buttons or a combination of two or more of the buttons; and a second keypad part comprising one or more buttons each assigned with an alphabet character having a high usage frequency. With the device, alphabet characters can be inputted in a simper and more efficient manner.

11 Claims, 6 Drawing Sheets

FIG. 1

(Related Art)

|  | ABC | DEF |
|---|---|---|
| GHI | JKL | MNO |
| PQRS | TUV | WXYZ |
|  |  |  |

| QZ | ABC | DEF |
|---|---|---|
| GHI | JKL | MNO |
| PRS | TUV | WXY |
|  |  |  |

FIG. 3A

| A | — | E |
|---|---|---|
| ( | \| | ) |
| O | . | V w |
|   | U x |   |

FIG. 3B

| A | — | E |
|---|---|---|
| ( | \| | ) |
| O | . | V w |
| T | U x | |

…

ALPHABET INPUT DEVICE AND ALPHABET RECOGNITION SYSTEM IN SMALL-SIZED KEYPAD

CROSS-REFERENCE TO RELATED APPLICATION

This application claims under 35 U.S.C. §119(a) the benefit of Korean Patent Application No. 10-2008-0067954 filed Jul. 14, 2008, the entire contents of which are incorporated herein by reference.

BACKGROUND

1. Technical Field

The present disclosure relates to an alphabet input device and an alphabet recognition system in a small-sized keypad.

2. Related Art

English alphabet input devices widely used in most of small-sized keypads are provided with a toggle function. FIG. 1 is a diagram illustrating the arrangement structure of such a keypad with a toggle function. As described in FIG. 1, the keypad is composed of a plurality of buttons formed in 4×3 matrix, in which two to four alphabets are disposed in each of the buttons.

To input alphabets with the toggle function, however, a user must be aware of positions of keys and toggle order and must push buttons many times in certain cases. Furthermore, when the user wants to input alphabets in the same button by permutation, it must wait for a predetermined time to input a subsequent character or press a movement button. As a result, the efficiency of the input process is reduced.

In order to solve the problems, various methods of inputting alphabet have been proposed, for example, as disclosed in Korean Patent Application Publication No. 10-2006-29430, Korean Patent Application Publication No. 2002-55833, and Korean Utility Model Registration No. 20-0419301. FIG. 2 shows the configurations of the alphabet input devices disclosed in the above references. In the alphabet input devices, an alphabet character is input using a combination of character keys.

The alphabet input devices, however, have a problem of an ambiguity occurring in the analysis of the input permutation of certain combination of characters. For example, in case of the device of Korean Patent Application Publication No. 10-2006-29430, F is input by a combination of 'l' and '-', and T is input by a combination of '-' and 'l'. If a user types a combination character permutation of 'l', '-', and 'l' to input IT, the combination character permutation may be recognized as FI as well as TI due to the ambiguity of analysis. In case of the device of Korean Utility Model Registration No. 20-0419301, V is input by 'V', I is input by 'l', and Y is input by a combination of 'V' and 'l'. If a user types 'V' and 'l' to input Y, this may be also recognized as VI. A similar ambiguity occurs in the device of Korean Patent Application Publication No. 2002-55833.

In order to solve the ambiguity, like the devices with toggle function, the devices with combination function still require an automatic time delay acting as a separator or a movement button.

On the other hand, the prior art technologies do not take into consideration usage frequency of each alphabet character in the design of the input methods and system.

The above information disclosed in this Background section is only for enhancement of understanding of the background of the invention and therefore it may contain information that does not form the prior art that is already known in this country to a person of ordinary skill in the art.

SUMMARY

Embodiments of the present invention are directed to provide an alphabet input device and an alphabet recognition system in a small-sized keypad, which can greatly reduce the number of input strokes and the time for inputting a word or phrase.

According to an aspect of the present invention, there is provided an alphabet input device in a small-sized keypad, including: a first keypad part comprising a plurality of buttons each of which is assigned with a symbol extracted from strokes of alphabet characters so that the alphabet characters be input by one of the buttons or a combination of two or more of the buttons; and a second keypad part comprising one or more buttons each assigned with an alphabet character having a high usage frequency.

According to another aspect of the present invention, there is provided an alphabet recognition system in a small-sized keypad, including a control part recognizing alphabet characters by a symbol or symbols, a character or characters, or both input by pressing one or more buttons of the first keypad part, the second keypad part, or both.

The above and other aspects will be discussed in detail infra.

BRIEF DESCRIPTION OF THE DRAWINGS

The above and other objects, aspects, features and other advantages of the present invention will be more clearly understood from the following detailed description taken in conjunction with the accompanying drawings, in which:

FIG. 1 is a diagram illustrating the arrangement structure of a related-art English keypad with a toggle function;

FIGS. 3A and 3B are diagrams illustrating a keypad of an alphabet input device according to an embodiment of the present invention;

DETAILED DESCRIPTION

Hereinafter, exemplary embodiments of the present invention will be described in detail with reference to the accompanying drawings.

Figure 3A:
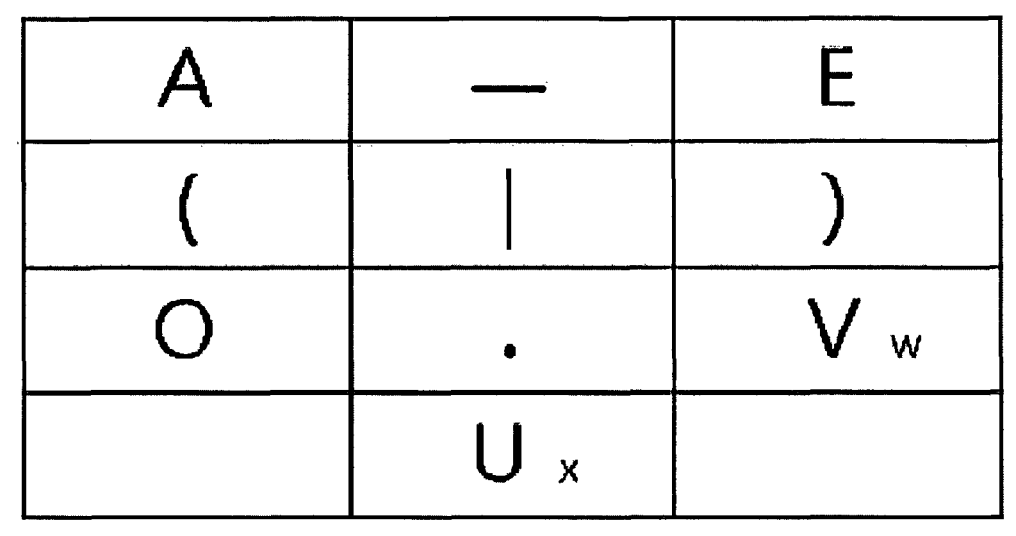
Figure 3B:
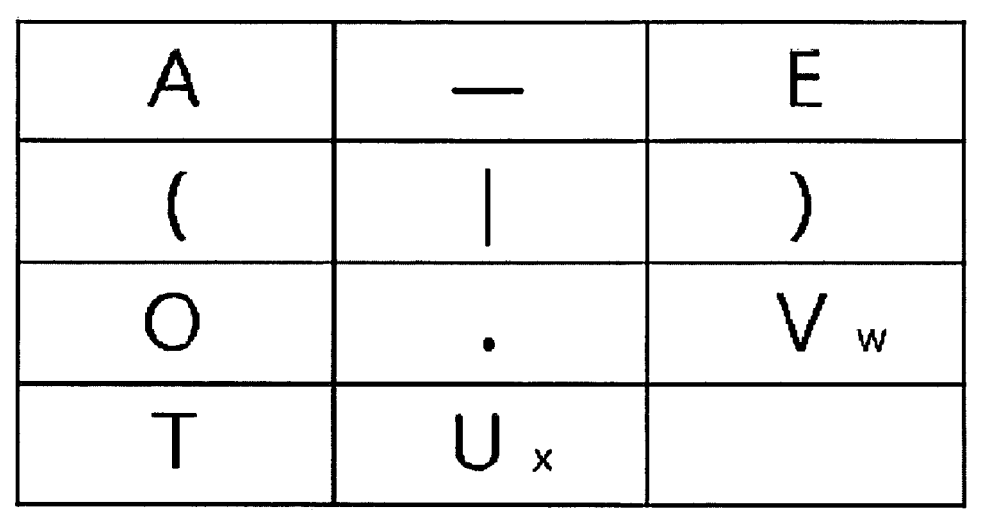
Figure 5:
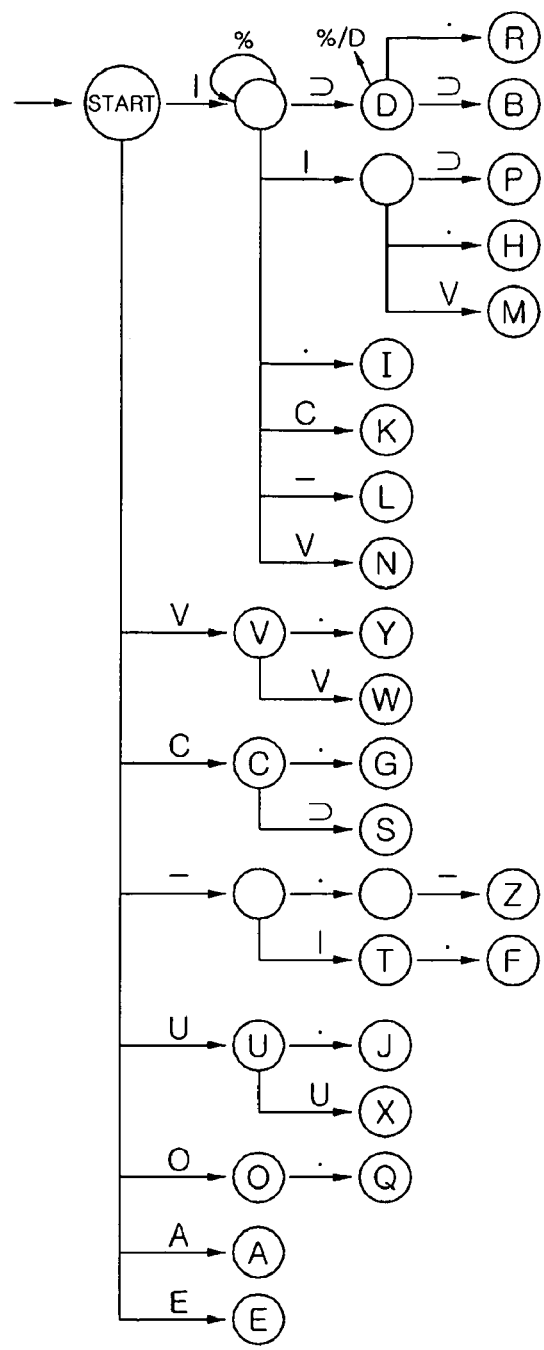
FIG. 5 is a diagram illustrating a combination tree structure in an alphabet input device according to an embodiment of the present invention.

FIGS. 3A, 3B and 5 are diagrams illustrating a keypad in an alphabet input device and an alphabet recognition system according to an embodiment of the present invention.

Referring to FIGS. 3A and 3B, the alphabet input device includes a first keypad part and a second keypad part.

The first keypad part includes a plurality of buttons. Each of the buttons is assigned to a symbol extracted from strokes of alphabet characters so that the alphabet characters may be constructed (input) by one of the buttons or a combination of two or more of the buttons. As a non-limiting example, the first keypad part may include seven buttons of '-', 'l', '.', '(', ')', 'U', and 'V'. It should be noted that the number of buttons of the first keypad part can be adjusted depending on design choice and other needs. It also should be noted that different sets of symbols can be determined and the position of the corresponding buttons can be adjusted.

The second keypad part includes one or more buttons. The button or buttons of the second keypad part are assigned to alphabet characters having high usage frequency. As a non-limiting example, the second keypad part includes five buttons which are assigned to alphabet characters of 'A', 'E', 'O', 'T', and 'I'. It should be noted that the number of buttons of the second keypad part can be adjusted and other needs. It also should be noted that different sets of alphabet characters can be determined as ones having high usage frequency and the position of the corresponding buttons can be adjusted.

The alphabet recognition system includes the first and second keypad parts and a control part. The control part recognizes alphabet characters by a symbol or symbols, a character or characters, or both input by pressing one or more buttons of the first keypad part, the second keypad part, or both. Also, the control part may control the recognized alphabet character or characters to be outputted through an output device.

In an embodiment, as shown in FIG. 3A, the first keypad part may include seven buttons of '-', '|', '.', '(', ')', 'U', and 'V', while the second keypad may include three buttons of 'A', 'E', and 'O'. In this case, however, the button 'O' may be considered to belong to the second keypad part because 'O' is an alphabet character having a high usage frequency as well as considered to belong to the first keypad part because 'Q' may be outputted upon a sequential input of 'O' and '.'.

In an embodiment, the alphabet input devices and the alphabet recognition systems may further include a conversion button part (not shown in the drawings) for converting a small letter into a capital letter and vice versa.

According to the embodiments, alphabets can be input in a hieroglyphic combination manner. Accordingly, unlike the devices and systems with the toggle function, the devices and systems with the hieroglyphic combination function do not require a button arrangement in which a plurality of alphabet characters are grouped into a button and do not require an automatic waiting time and/or a movement button.

According to an embodiment, the number of key buttons constituting a keypad may be set to a particular number, e.g., ten (FIG. 3A) so that the devices and systems can be applied to an existing keypad.

Preferably, the buttons may be arranged in consideration of the usage frequency of respective alphabets and a predefined combination tree structure. Also, one character may be assigned to one button to have an intuitive interface.

In a modified embodiment, a character having a high usage frequency, such as T (FIG. 3B), may be assigned to one of the two blank keys.

It is noted, however, that the present invention is not be limited to the arrangement forms.

Figure 2:
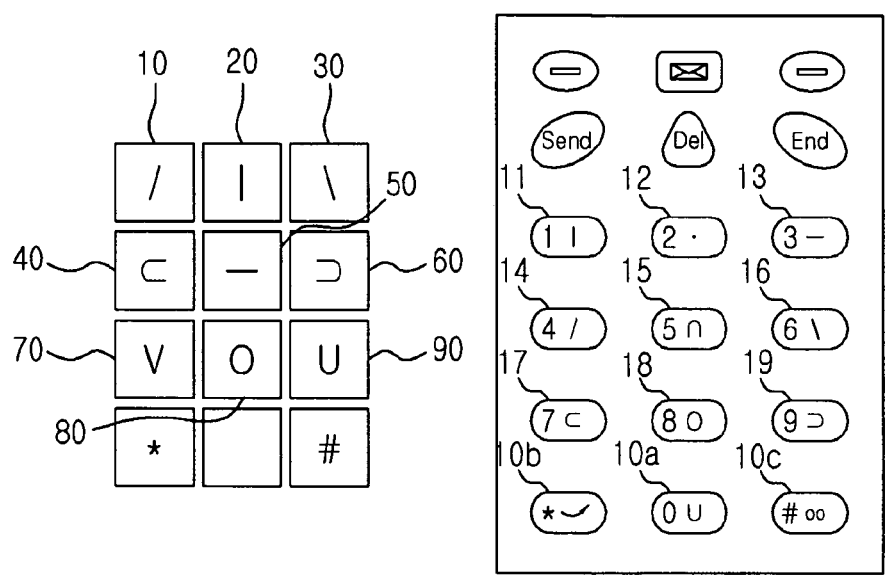
FIG. 2 is a diagram illustrating the configurations of related-art alphabet input devices with a combination function.
Figure 4:
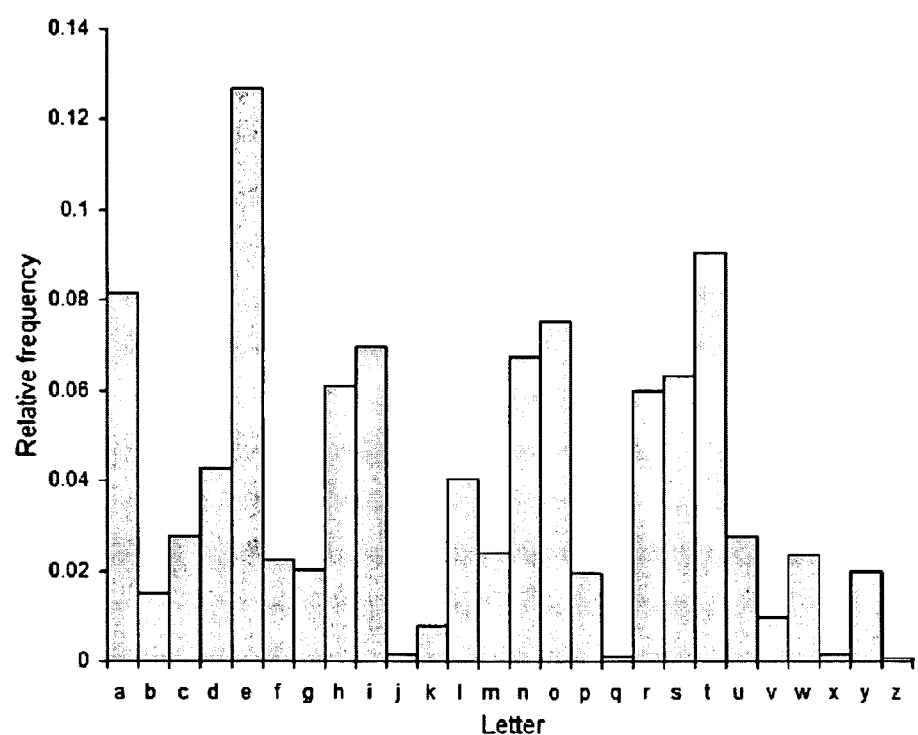
FIG. 4 is a graph illustrating statistical data about frequency of alphabet characters in English phrases.

FIG. 4 is a statistical data about frequency of alphabet characters used in English phrases. As shown in FIG. 4, E, T, A, O, and I have higher usage frequencies than other alphabet characters. At least one of the alphabet characters having higher usage frequencies may be designed to be inputted by one-click. Minimizing the number of click for inputting such high frequency alphabet characters, preferably coupled with the hieroglyphic combination function, enables users to input alphabet characters in a more convenient and efficient manner.

As discussed above, the present invention is not limited thereto. Various modification can be made depending on the design choice and other needs. For instance, as illustrated in FIGS. 3A, 3B and 5, only E, A, and O among E, T, A, O, and I may be inputted by one-click (T and I may be inputted by a combination of symbols).

In this case, the other alphabet characters may be inputted by a combination of buttons of the first and second keypad parts. For example, T can be inputted by the combination of '-' and '|', L can be inputted by the combination of '|' and '-', F can be inputted by the combination of '-', '|' and '.'.

In case T is assigned to a blank key as shown in FIG. 3B, T may be inputted by one-click. Even in this case, it is possible to design the device so that T can be inputted also by a combination characters.

FIG. 5 is a diagram illustrating a combination tree structure of each alphabet in an alphabet input device according to an embodiment of the present invention.

As illustrated in FIG. 5, the control part recognizes a sequential input of '|', ')', and ')' as 'B', an input of '(' as 'C', and a sequential input of '|', and ')' as 'D'.

The control part recognizes a sequential input of '-', '|' and '.' as 'F', a sequential input of '(' and '.' as 'G', and a sequential input of '|', '|' and '.' as 'H'.

The control part recognizes a sequential input of '|', and '.' as 'I', a sequential input of 'U' and '.' as 'J', and a sequential input of '|' and '(' as 'K'.

The control part recognizes a sequential input of '|', and '-' as 'L', a sequential input of '|', '|' and 'V' as 'M', and a sequential input of '|' and 'V' as 'N'.

The control part recognizes a sequential input of '|', '|' and ')' as 'P', a sequential input of 'O' and '.' as 'Q', and a sequential input of '|', ')', and '.' as 'R'.

The control part recognizes a sequential input of '(' and ')' as 'S', a sequential input of '-' and '|' as 'T', a sequential input of 'V' and '.' as 'Y', and a sequential input of '-', '.', and '-' as 'Z'.

The control part recognizes double inputs of 'V' within a predetermined time as 'W'. If the double click is not performed within a predetermined time, e.g., 0.2 seconds, each click is recognized as 'V'.

The control part recognizes double inputs of 'U' within a predetermined time as 'X'. If the double click is not performed within a predetermined time, e.g., 0.2 seconds, each click is recognized as 'U'.

The control part recognizes and displays the input of 'A' and 'E' as it is, respectively.

The control part recognizes an input of 'O' followed by an input of any other button except '.' as 'O'.

The control part recognizes an input of 'U' within a predetermined time or followed by an input of any other button except '.' as 'U'. The control part recognizes an input of 'V' within a predetermined time or followed by an input of any other button except '.' as 'V'.

As shown in FIG. 3B, if T is assigned to one of key buttons of the keypad, the control part recognizes an input of 'T' as 'T'. That is, a user is not required to sequentially click '-' and '|' buttons in order to input 'T'. As discussed above, in this case, it is possible to design so that T can be inputted also by a combination of symbols (e.g., '-' and '|').

The control part recognizes the inputted alphabet character or characters and outputs the recognized alphabet character or characters through an output device.

As described above, the combination tree structure of alphabet characters defined by the hieroglyphic combination method according to an embodiment of the present invention can fundamentally solve the limitations of the related-art systems.

In an embodiment, the devices and systems may further provide a function to delete an inputted character efficiently. That is, when a user wants to delete an inputted character, the user may move to a previous combination state and, optionally, make another combination by clicking a button or buttons. For example, 'B' turns to 'D' through deletion of ')'. In this case, if '.' is inputted, 'D' turns to 'R'.

The devices and systems using the combination input manner coupled with consideration of usage frequency according to the present invention require less input strokes and take shorter time than those using the related-art toggle input manner. For example, assume that a word 'DEFENCE' is inputted. While the toggle type devices and systems require eighteen input strokes including a movement button, the combination type devices and systems according to the present invention require only eleven input strokes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An alphabet input device in a small-sized keypad, comprising:
a first keypad part comprising a plurality of buttons each of which is assigned with a symbol extracted from strokes of alphabet characters so that the alphabet characters be input by one of the buttons or a combination of two or more of the buttons; and
a second keypad part comprising one or more buttons each assigned with an alphabet character having a high usage frequency,
wherein
the symbol comprises '-', '|', '.', '(', ')', 'U', and 'V';
the alphabet character having a high usage frequency comprises 'A', 'E', and 'O',
'A' is output in response to input of the 'A' button,
'B' is output in response to input in order of the '|', ')', and ')' buttons,
'C' is output in response to input of the '(' button,
'D' is output in response to input in the order of the '|' and ')' buttons,
'E' is output in response to input of the 'E' button,
'F' is output in response to input in the order of the '-', '|', and '.' buttons,
'G' is output in response to input in the order of the '(' and '.' buttons,
'H' is output in response to input in the order of the '|', '|' and ' ' buttons,
'I' is output in response to input in the order of the '|', and '.' buttons,
'J' is output in response to input in the order of the 'U' and '.' buttons,
'K' is output in response to input in the order of the '|' and '(' buttons,
'L' is output in response to input in the order of the '|' and '-' buttons,
'M' is output in response to input in the order of the '|', '|' and 'V' buttons,
'N' is output in response to input in the order of the '|' and 'V' buttons,
'O' is output in response to input of the 'O' button,
'P' is output in response to input in the order of the '|', '|' and ')' buttons,
'Q' is output in response to input in the order of the 'O' and '.' buttons,
'R' is output in response to input in the order of the '|', ')' and '.' buttons,
'S' is output in response to input in the order of the '(' and ')' buttons,
'T' is output in response to input in the order of the '-' and '|' buttons,
'U' is output in response to input of the 'U' button,
'V' is output in response to input of the 'V' button,
'W' is output in response to input in the order of the 'V' and 'V' buttons,
'X' is output in response to input in the order of the 'U' and 'U' buttons,
'Y' is output in response to input in the order of the 'V' and '.' buttons, and
'Z' is output in response to input in the order of the '-', '.' and '-' buttons.

2. The alphabet input device as set forth in claim 1, wherein the alphabet character having a high usage frequency further comprises 'T', and 'I'.

3. The alphabet input device as set forth in claim 1, wherein the alphabet character having a high usage frequency further comprises 'T'.

4. The alphabet input device as set forth in claim 1, further comprising a conversion button part converting a small letter into a capital letter and vice versa.

5. An alphabet recognition system in a small-sized keypad, comprising:
a first keypad part comprising a plurality of buttons each of which is assigned with a symbol extracted from strokes of alphabet characters so that the alphabet characters be input by one of the buttons or a combination of two or more of the buttons;
a second keypad part comprising one or more buttons each assigned with an alphabet character having a high usage frequency; and
a control part recognizing alphabet characters by a symbol or symbols, a character or characters, or both input by pressing one or more buttons of the first keypad part, the second keypad part, or both,
wherein
the symbol comprises '-', '|', '.', '(', ')', 'U', and 'V'; and
the alphabet character having a high usage frequency comprises 'A', 'E', and 'O'; and
the control part recognizes:
'A', if the 'A' button is input,
'B', if the '|', ')', and ')' buttons are input in order,
'C', if the '(' button is input,
'D', if the '|' and ')' buttons are input in order,
'E', if the 'E' button is input,
'F', if the '-', '|', and '.' buttons are input in order,
'G', if the '(', and '.' buttons are input in order,
'H', if the '|', '|' and '.' buttons are input in order,
'I', if the '|', and '.' buttons are input in order,
'J', if the 'U' and '.' buttons are input in order,
'K', if the '|' and '(' buttons are input in order,
'L', if the '|' and '-' buttons are input in order,
'M', if the '|', '|' and 'V' buttons are input in order,
'N', if the '|' and 'V' buttons are input in order,
'O', if the 'O' button is input,
'P', if the '|', '|' and ')' buttons are input in order.
'Q', if the 'O' and '.' buttons are input in order,
'R', if the '|', ')' and '.' buttons are input in order,
'S', if the '(' and ')' buttons are input in order,
'T', if the '-' and '|' buttons are input in order,
'U', if the 'U' button is input,
'V', if the 'V' button is input,
'W', if the 'V' and 'V' buttons are input in order,
'X', if the 'U' and 'U' buttons are input in order,
'Y', if the 'V' and '.' buttons are input in order, and
'Z', if the '-', '.' and '-' buttons are input in order.

6. The alphabet recognition system as set forth in claim 5, wherein the alphabet character having a high usage frequency further comprises 'T', and 'I'.

7. The alphabet recognition system as set forth in claim 5, wherein the control part recognizes:
- 'O', if the 'O' button is input and then another button excluding the '.' button is input,
- 'U', if the 'U' button is input and then the 'U' button is input in a predetermined time, or if the 'U' button is input and then another button excluding the '.' button is input, and
- 'V', if the 'V' button is input and then the 'V' button is input in a predetermined time, or if the 'V' button is input and then another button excluding the '.' button is input.

8. The alphabet recognition system as set forth in claim 5, wherein the alphabet character having a high usage frequency further comprises 'T'.

9. The alphabet recognition system as set forth in claim 8, wherein the control part recognizes an input of 'T' as 'T'.

10. The alphabet recognition system as set forth in claim 5, wherein the control part controls a recognized alphabet character to be outputted to an output device.

11. The alphabet recognition system as set forth in claim 5, further comprising a conversion button part converting a small letter into a capital letter and vice versa.

\* \* \* \* \*